United States Patent
Maisonnier et al.

(10) Patent No.: US 9,205,557 B2
(45) Date of Patent: Dec. 8, 2015

(54) SYSTEM AND METHOD FOR GENERATING CONTEXTUAL BEHAVIORS OF A MOBILE ROBOT

(75) Inventors: Bruno Maisonnier, Paris (FR); Jérôme Monceaux, Paris (FR)

(73) Assignee: Aldebaran Robotics S.A., Paris (FR)

( * ) Notice: Subject to any disclaimer, the term of this patent is extended or adjusted under 35 U.S.C. 154(b) by 474 days.

(21) Appl. No.: 13/383,196

(22) PCT Filed: Jul. 12, 2010

(86) PCT No.: PCT/EP2010/004234
§ 371 (c)(1),
(2), (4) Date: Feb. 14, 2012

(87) PCT Pub. No.: WO2011/003628
PCT Pub. Date: Jan. 13, 2011

(65) Prior Publication Data
US 2012/0197436 A1    Aug. 2, 2012

(30) Foreign Application Priority Data

Jul. 10, 2009  (FR) ...................................... 09 54837

(51) Int. Cl.
*G05B 19/18* (2006.01)
*B25J 9/16* (2006.01)
*G06F 9/44* (2006.01)
*G06F 19/00* (2011.01)

(52) U.S. Cl.
CPC *B25J 9/1656* (2013.01); *G06F 8/34* (2013.01)

(58) Field of Classification Search
CPC ............... G06F 9/44; B25J 9/16; G05B 15/00

USPC ................................................... 700/250, 252
See application file for complete search history.

(56) References Cited

U.S. PATENT DOCUMENTS

| | | | |
|---|---|---|---|
| 5,838,973 A * | 11/1998 | Carpenter-Smith et al. | 717/105 |
| 6,073,102 A * | 6/2000 | Block | 704/275 |
| 6,259,969 B1 * | 7/2001 | Tackett et al. | 700/264 |
| 6,330,539 B1 * | 12/2001 | Takayama et al. | 704/275 |
| 6,629,087 B1 * | 9/2003 | Benson et al. | 706/11 |

(Continued)

FOREIGN PATENT DOCUMENTS

| EP | 1669172 A1 | 6/2006 |
|---|---|---|
| JP | 05-061637 | 9/1994 |

(Continued)

OTHER PUBLICATIONS

Senzo, Changes Brought by HTML 4.0, AI Mook 199, Homepage Building by Latest HTML! Japan, AI Publishing, May 30, 1998, First Edition, p. 94.

*Primary Examiner* — Ian Jen
(74) *Attorney, Agent, or Firm* — Baker & Hostetler LLP (57) ABSTRACT

A system and a method for generating behaviors of a robot capable of reproducing a script, notably according to the meaning of the script and, possibly, reactions of the environment of the robot. For this, the system is provided with a library of command tags and a module for inserting said tags into the editor of the script to be reproduced by the robot or robots. The system and method enable a user who does not have particular programming knowledge to produce complex scenarios for use of his or her robot. These scenarios can also be swapped between different users.

14 Claims, 7 Drawing Sheets

```
<bml>
   <speech id="s">
      This is
      <mark time="1.0" />
      a sentence ,
      <mark time="2.5" />
      split into
      <mark time="3.5" name="m3" />
      many parts |
   </ speech>
   <gesture type="beat" stroke="s : m3" />
</bml>
```

(56) References Cited

U.S. PATENT DOCUMENTS

| | | | |
|---|---|---|---|
| 6,724,409 B1* | 4/2004 | Maddocks et al. | 715/853 |
| 7,367,017 B2* | 4/2008 | Maddocks et al. | 717/115 |
| 7,434,176 B1* | 10/2008 | Froloff | 715/839 |
| 7,983,794 B2* | 7/2011 | Kawabe et al. | 700/264 |
| 7,984,005 B2* | 7/2011 | Bridges et al. | 706/45 |
| 8,060,365 B2* | 11/2011 | Itoh et al. | 704/235 |
| 8,065,157 B2* | 11/2011 | Tsuboi | 704/277 |
| 2001/0021907 A1* | 9/2001 | Shimakawa et al. | 704/260 |
| 2002/0038168 A1* | 3/2002 | Kasuga et al. | 700/245 |
| 2004/0193322 A1* | 9/2004 | Pirjanian et al. | 700/259 |
| 2005/0027540 A1* | 2/2005 | Yamada et al. | 704/275 |
| 2005/0065652 A1* | 3/2005 | Sakagami et al. | 700/245 |
| 2005/0171741 A1* | 8/2005 | Doi | 702/189 |
| 2006/0177802 A1* | 8/2006 | Hiroe et al. | 434/185 |
| 2006/0195598 A1* | 8/2006 | Fujita et al. | 709/230 |
| 2007/0038332 A1* | 2/2007 | Ozaki et al. | 700/245 |
| 2007/0142965 A1* | 6/2007 | Lin | 700/245 |
| 2007/0203709 A1* | 8/2007 | Yasutaka | 704/275 |
| 2008/0071540 A1* | 3/2008 | Nakano et al. | 704/251 |
| 2008/0263164 A1* | 10/2008 | Portele et al. | 709/206 |
| 2009/0033470 A1* | 2/2009 | Fu et al. | 340/10.4 |
| 2012/0197436 A1* | 8/2012 | Maisonnier et al. | 700/250 |

FOREIGN PATENT DOCUMENTS

| | | |
|---|---|---|
| JP | 09-185607 | 2/1999 |
| JP | 2002127062 A1 | 5/2002 |
| JP | 2003308142 A | 10/2003 |
| JP | 2002268663 | 4/2004 |
| JP | 2006263858 A | 10/2006 |
| JP | 4271193 B2 | 6/2009 |
| JP | 20080168375 A1 | 1/2010 |

* cited by examiner

```
<bml>
<speech id="s">
    This is
    <mark time="1.0" />
    a sentence,
    <mark time="2.5" />
    split into
    <mark time="3.5" name="m3" />
    many parts!
</speech>
<gesture type="beat" stroke="s : m3" />
</bml>
```

☺ Je vais te raconter une devinette.

☺ Quand tu auras trouvé la réponse,[Here] appuie sur mon bumper !

☺ Monsieur et Madame Despommes ont un fils.

☺ Comment s'appelle-t-il ?

[Bumper]

☺ Ivan, parce que " il vend des pommes ! "

FIG.6

1. I have an idea ! said Nao.
2. What is it ? asked the others Nows.
3. Lets play soccer ! answered Nao They had a goog time playing soccer [But] but the four of them had the same color [After] and they soon forgot what the teams were.

1. I have an idea ! said Nao.
2. What is it ? asked the others Nows.
3. Lets have different colors ! said Nao.

[After] From that time there are blue Nows and red Nows. [Always] And they are good at soccer !

FIG.7

SYSTEM AND METHOD FOR GENERATING CONTEXTUAL BEHAVIORS OF A MOBILE ROBOT

CROSS-REFERENCE TO RELATED APPLICATIONS

This application is a National Stage of International patent application PCT/EP2010/004234, filed on Jul. 12, 2010, which claims priority to foreign French patent application No. FR 09 54837, filed on Jul. 10, 2009, the disclosures of each of which are incorporated by reference in their entireties.

FIELD OF THE DISCLOSED SUBJECT MATTER

The present invention belongs to the field of robot programming systems. More specifically, it applies to the control of behaviors consistent with the context in which the robot, notably of human or animal form, maneuvers, expresses itself and moves around on limbs, whether articulated or not.

BACKGROUND

A robot can be qualified as humanoid when it has certain attributes of the appearance and of the functionalities of a human being: a head, a trunk, two arms, possibly two hands, two legs, two feet, etc. One of the functionalities likely to give the robot an appearance and behaviors that are quasi-human is the possibility of ensuring a strong coupling between gestural expression and oral expression. In particular, achieving this result intuitively would enable new groups of users to access humanoid robot behavior programming. This issue has not been correctly resolved by the prior art. In the fields of virtual agents and avatars, languages specializing in the programming of behaviors at both functional and intentional level, independently of the physical actions, such as FML (Function Markup Language), or at the actual behavioral level (which involve several parts of the virtual character to execute a function), such as BML (Behavior Markup Language), remain accessible only to the professional programmer and do not integrate with scripts written in everyday language.

SUMMARY

The invention makes it possible to overcome these limitations in the prior art.

Notably, the invention allows insertion into a text spoken by the robot of commands for intonation and/or behaviors associated with the oral expression, said commands being possibly expressed graphically for example.

To this end, the present invention discloses a system for editing and controlling behaviors of at least one robot comprising a module for editing a script to be reproduced by the robot, a sound synthesis module for synthesizing said script, a library of command for both behaviors to be executed by the robot, a module for inserting said tags into said script and a module for generating and controlling the behaviors of said robot, said system being characterized in that said library of command tags comprises at least one tag for controlling a behavior dependent on the content of the script.

Advantageously, the editing and control system of the invention also comprises a module for monitoring the environment of the robot and said library of command tags comprises at least one tag for controlling a behavior dependent on the environment of the robot.

Advantageously, the library of command tags comprises at least one tag chosen from the group of wait commands, commands in response to an expected external action.

Advantageously, the command tags are chosen from the group comprising graphic symbols, punctuation marks and words.

Advantageously, some of the command tags are inserted into the script in the form of a list, each item in said list corresponding to a phrase member with which a group of behaviors is associated.

Advantageously, some of the command tags are inserted into the script between at least one opening separator and at least one closure separator which respectively trigger the start of a series of behaviors and the end of said series.

Advantageously, the behaviors to be executed by the robot are chosen from the group comprising combinations of the modulations of the voices reading the script, gestures accompanying the script and signal emissions.

Advantageously, the modulations of the voices are chosen from a group comprising combinations of different languages, voices, tones, speeds and intonations.

Advantageously, the script editing module communicates with the module for controlling the behaviors of the robot by an electronic messaging module.

Advantageously, the editing and command system according to the invention is capable of dialoging with elements belonging to a group comprising physical robots, virtual robots and computers.

Advantageously, the robots belonging to the controlled group each execute a part of the script determined by at least one command tag characteristic of each of the elements of the group.

Advantageously, the behavior controlled by a command tag may change according to a method chosen from the group comprising random change, cyclic change or contextual change.

The invention also discloses a method for editing and controlling behaviors of at least one robot comprising a step of editing a script to be reproduced by the robot, a step of sound synthesizing said script, a step of reading from a library of command tags of behaviors to be executed by the robot, a step of inserting said tags into said script and a step of controlling the behaviors of said robot, said method being characterized in that said library of command tags comprises at least one tag for controlling a behavior dependent on the content of the script.

The invention allows creation of libraries of behaviors and easy insertion of these into a script of scenes acted out by the robot. Furthermore, the language used is formally very close to the one which is used on the Internet and is therefore very easily accessible, with no prior knowledge or training.

The invention also appropriately complements French patent application No. 09/53434 relating to a system and a method for editing and controlling the behaviors of a mobile robot, filed in the name of the applicant. The latter provides means for having behaviors executed by a robot, said behaviors being able to be controlled either by using a specialized script language, accessible to programmers, or graphically by using preprogrammed libraries which may be selected and inserted into a series of behavior boxes linked by events. The present invention allows further simplification of the robot behavior programming interface.

BRIEF DESCRIPTION OF THE DRAWINGS

The invention will be better understood and its various features and advantages will become apparent from the following description of a number of exemplary embodiments and its appended figures in which.

DETAILED DESCRIPTION

Figure 1:
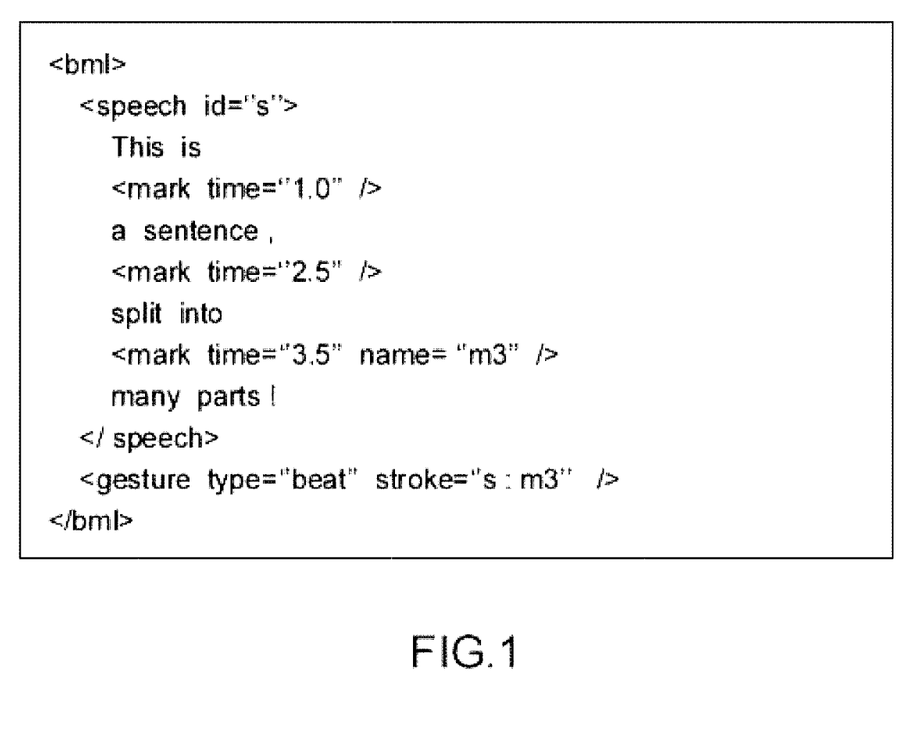
FIG. 1 is an example of behavior programming using elements of the BML language according to a prior art document.

FIG. 1 is an example of behavior programming using elements of the BML language according to a prior art document.

BML programming is intended for a virtual robot and not a physical robot. It therefore does not generate commands that can be directly executed by a physical robot.

Furthermore, in BML programming, the script which has to be read by the robot is not directly accessible from the programming editor (cf. <sentence> instruction). This type of programming interface is therefore not accessible to a user without technical programming capabilities. It is a distinctive feature in totally natural language in which the text which is reproduced by a physical robot is directly accessible in the command editor. Other distinctive features will be detailed hereinafter in the description.

Figure 2:
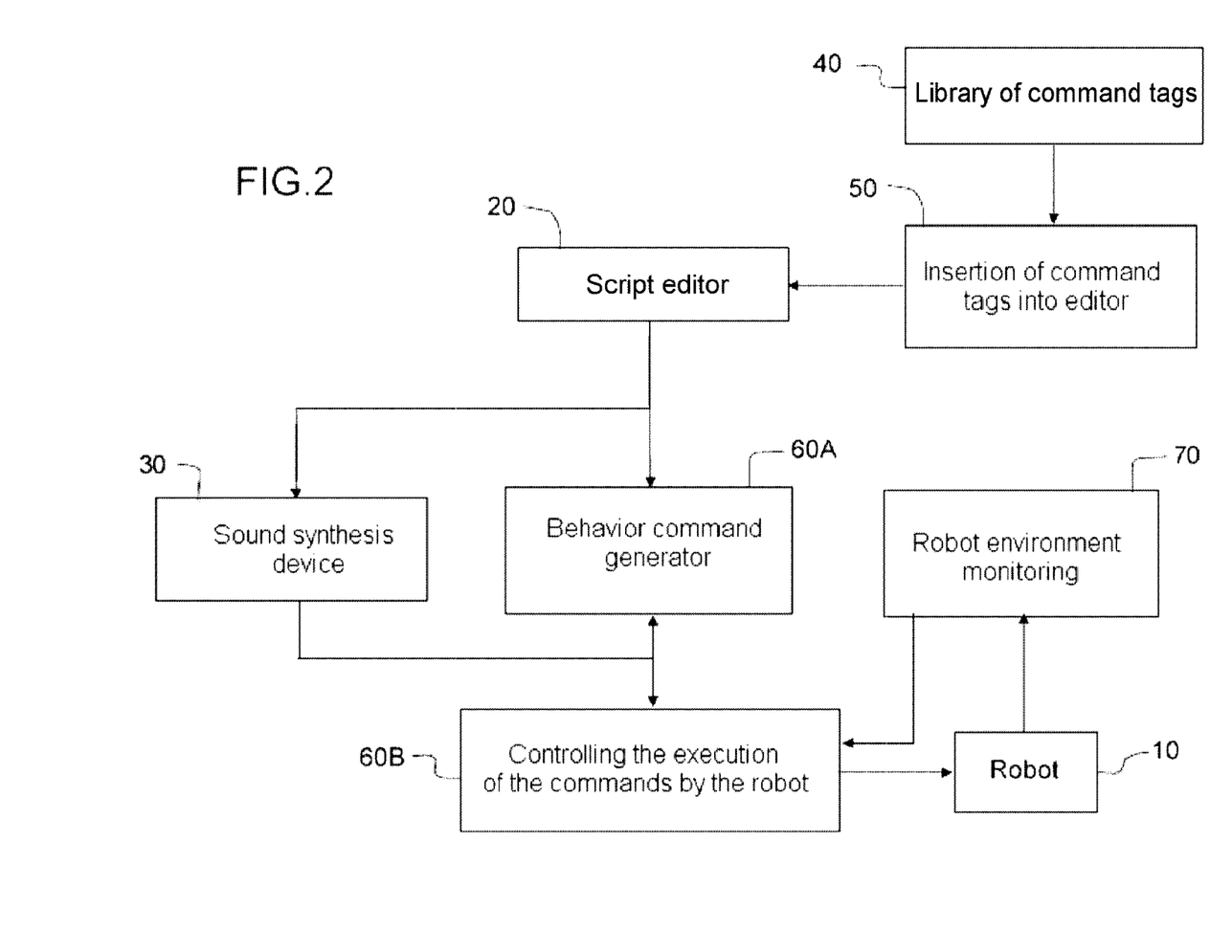
FIG. 2 is a flow diagram indicating the main steps of the method of the invention in one of its embodiments.

FIG. 2 is a flow diagram indicating the main steps of the method of the invention in one of its embodiments.

The system is capable of controlling the behavior of a robot 10 which may be a humanoid robot with two lower limbs and two upper limbs or a robot with the appearance of an animal with two or four lower limbs. The limbs of the robot may be provided with motorized articulations, controlled by cards, possibly enabling it to move around according to commands which are embedded and interpreted by one or more processors or transmitted from a server in a form that is directly executable by the embedded processor or processors or which have to be generated by said processors. The robot is advantageously provided with a head and a body complementing its humanoid or animal form. It is also advantageously provided with sensors enabling it to position itself in its environment and to perceive sound or motion signals originating from said environment. The robot may also have other capabilities for action with its environment, such as light or sound emission sources, or even the possibility of acting on the Internet such as, for example, sending mail or making a telephone call or modifying the environment by communication with a home automation system.

To implement the invention, the editing and control system is provided with a script editor 20 in which is entered a text intended to be reproduced by the robot in the form of sound signals. This input can be made directly using a simple computer keyboard or by loading a text-type file (*.doc, *.txt or similar) or an html file (possibly designated by its URL address) into the system. These files may also be received from a remote site, for example via a messaging system. To make this reading function work, the system or the robot are provided with a synthesis device 30 capable of interpreting the text of the script editor to produce sounds, which may be either speech in the case of a humanoid robot, or sounds representative of the behavior of an animal. The sound synthesis device may also reproduce background sounds, for example ambient music which, optionally, can be played on a remote computer.

The reading of a story may be triggered upon receipt of an event external to the robot such as:
 the reception of an electronic message (mail, SMS, telephone call or other message),
 a home automation event (for example, the opening of the door by someone, light switched on by someone, or other event).

The system comprises a library 40 of command tags intended to be inserted into the script editor via an insertion module 50. Advantageously, the insertion is made by dragging ("drag and drop" action with a mouse connected to the computer on which the editor is installed) the chosen command tag into the editor.

Figure 3:
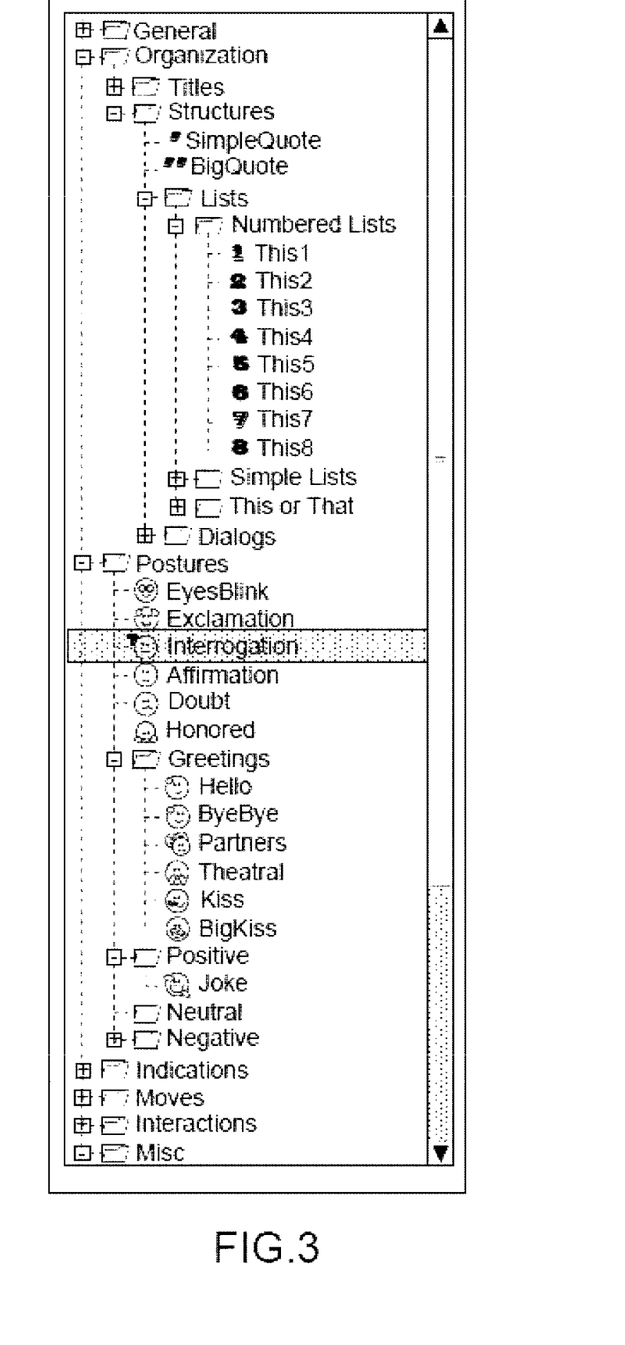
FIG. 3 is a view of a tree of the command tags provided to implement the invention in one of its embodiments.

FIG. 3 is a view of a tree of the command tags provided to implement the invention in one of its embodiments;

The various command tags are grouped together by the type of behavior to be generated in directories, some of which can be viewed alongside the script editor.

The tree structure developed from the highest-type level is reproduced below:
General
  Language
    French
    English
    Spanish
    . . .
  Prosody
    Speed
      slow
      average
      fast
    Volume
      low
      medium
      high
    Style
      cartoon
      normal
      speed
    Voice
      Heather
      Julie
      Kenny
Organization
  Titles
    Main title
    Subheading
    Author
  Structures
    Citation
    Lists
      Numbered
      Non-numbered
Attitudes
  Exclamation
  Interrogation
  Affirmation
  Doubt
  Honored
  Joker
  Courtesy Hello
Hi
Goodbye
Kisses
Indications
  Place
    Here
    Everywhere
    Nowhere
    Far
    There
    Beside
  Time
    Before
    After
    Always
    A long time ago
  Manner
    Gently
    Boldly
  Quantity
    A lot
    A little
    Too much
    Enough
  Negative
    Not
    None
    Never
Emotions
  Dance
  Walk
  Cheer
Interactions
  Detect face
  Bumper (press foot button)
  Detect presence (ultrasounds)

This list is not limiting. It can be added to using a robot editing and control system editor applying the teachings of the present invention.

Examples of command types are more particularly detailed below:
  forms of reading of the script (or prosody): for example, the language in which the script will be read, in the case of a humanoid robot, can be chosen (French, English, American English, German, Russian, etc.); the voice may be a male, female or child's voice; the tonality may be more or less deep or high; the speed may be more or less fast; the intonation may be chosen according to the emotion that the robot is likely to feel according to the text of the script (affection, surprise, anger, joy, reproof, etc.);
  gestures accompanying the script: for example, movement of the arms upward or downward; striking a foot on the ground; movements of the head upward, downward, to the right or to the left, depending on the impression that is to be communicated in line with the script, etc.;
  emission of signals: for example, if the robot is provided with light-emitting diodes (LED), these may be actuated to translate strong emotions "felt" by the robot on reading the text or to generate a blinking of the eyes adapted to the form and to the speed of elocution.

Using a behavior generation module 60A, the tags inserted into the script generate the execution of the corresponding commands by the robot by passing through a control module 60B which can pass on to the generation module signals transmitted by the robot in response to the commands.

As it emerges on reading the examples mentioned above, one of the features of the invention is to allow for the automatic generation of commands consistent with the content of the script to be read by the robot. A first way of producing this coupling is to have command tags linked to the punctuation: in this case, an interrogation mark will generate a tone command consistent with the interrogative mode. Likewise for an exclamation mark. Some words or punctuation marks may also automatically generate a tag which will order a behavior consistent with this word. To give some nonlimiting illustrations:
  quote marks may be linked to a tag programmed to initiate a "citation" gesture, which consists in lifting the arms and opening and closing the fingers of the hand twice;
  adverbs or keywords such as "here", "after", "a lot", may be linked to a tag programmed to initiate the corresponding gesture;
  the word "hello" may be linked to a tag programmed to automatically generate a command tag to lift arms;
  the expression "I love you" may be linked to a tag programmed to automatically generate a control of the LEDs of the face which generates a reddening thereof;
  the expression "drives a car" may be linked to a tag programmed to generate a motion imitating the gesture indicated in the expression;
  the expression "he was furious" will be accompanied by a modulation of the voice and a motion symbolizing anger;
  the expression "he carefully looked the person in the eyes" will be underlined by a rotation of the head of the robot in the direction of a person in attendance;
  bullet lists and numbered lists, in which each bullet or number may initiate an enumeration motion (the hand descends by one vertical notch on each bullet).

Advantageously, some commands may be commands to stop and wait for an external event, such as a motion in response to a question posed by the robot.

Thus, certain commands may be dependent on the reactions of the robot to its environment, as measured via an environment monitoring module 70. This module is interfaced with sensors embedded on the robot. For example, a camera may identify characteristic elements in the environment of the robot, such as another robot or a human being offering a hand to the robot, or quite simply the presence or the absence of an audience so as to play the text only when there is a public present. Similarly, the sensors may be, alternatively or in addition, ultrasound sensors which allow detection of a motion in the environment close to the robot. In this case, if it is a response expected by the script in which a wait command has been inserted, the next command is executed.

Advantageously, the commands in the library are converted into the syntax of the tag language used to implement the invention based on commands generated by the editing and control system disclosed by French patent application No. 09/53434 relating to a system and a method for editing and controlling the behaviors of a mobile robot, filed in the name of the applicant. According to this invention, the commands obey a dual time and event-oriented logic, which is particularly suitable in the case of interactions of a robot with its environment.

The editing and control system according to the invention may allow controlling of several robots, both close and remote. Provision can be made for the choice of the robot required to play a particular passage of a script to be at the discretion of the user who can make his choice for example using tabs provided for this purpose in the interface of the editing and control system. It is also possible to automate this allocation of passages of the script corresponding to different characters to distinct robots, by embedding particular tags corresponding to each of the characters in the script.

Figure 4:
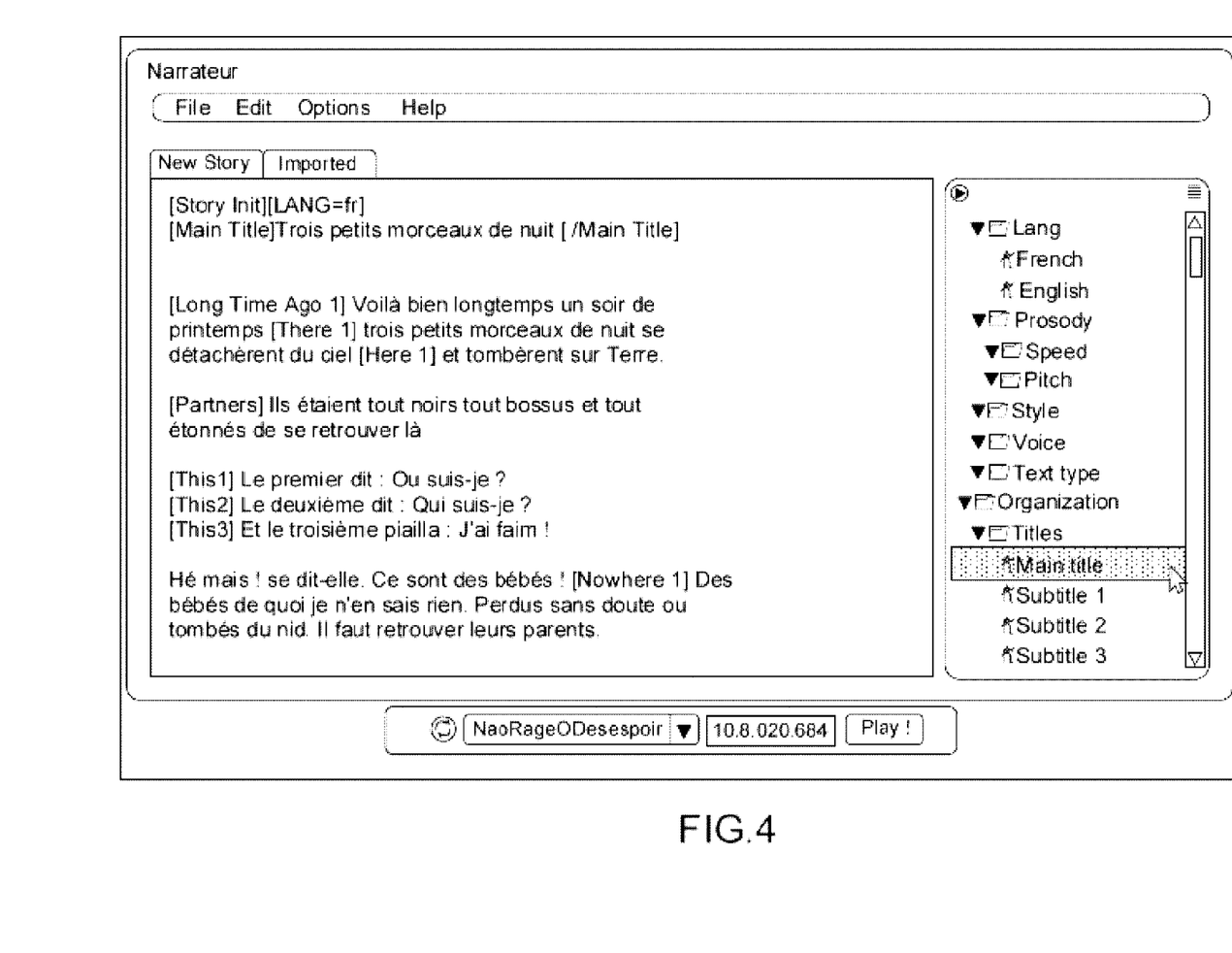
FIG. 4 is a first example of scenario of use of the invention in one of its embodiments.

FIG. 4 is a first example of a scenario of use of the invention in one of its embodiments.

In this embodiment, the possible use of lists provided with numbered tags can be seen in particular, each of the elements in the list being assigned to a sentence and initiating a behavior suited to the content of the sentence. In particular:

[Story Init]->places the robot in position to tell a story (makes it stand if it is seated for example);

[LANG=fr]->changes the current language of the robot, so the robot is multilingual and the editor supports all the languages of the robot (English, French, Italian, Spanish, German, etc.);

[Main Title] . . . [/Main Title]->pair of opening and closure tags initiating and terminating a behavior;

[Long Time Ago]->the robot makes a gesture of the arm backward, thus signifying that the action took place in the past;

[There1]->Corresponds to the keyword "there", the robot makes a gesture of the arm toward the horizon indicating a far-off place;

[Here1]->Corresponds to the keyword "here", the robot makes a gesture of the arm downward indicating the proximity of the action;

sentence beginning with the tag [This1] can be read with a first voice, with an interrogative tone;

the sentence beginning with the tag [This2] can be read with a second voice, also with an interrogative tone;

the sentence beginning with the tag [This3] can be read with a third voice, with an exclamative tone;

[Nowhere]->corresponds to "nowhere", the robot makes a gesture of denial with the head (horizontal shake).

The opening and closing tags of a behavior can be nested on several levels. Several behaviors can then be executed either all simultaneously (same start and same end) or over periods for which the openings and closings are initiated according to the placement of the opening and closing tags in the script.

Figure 5:
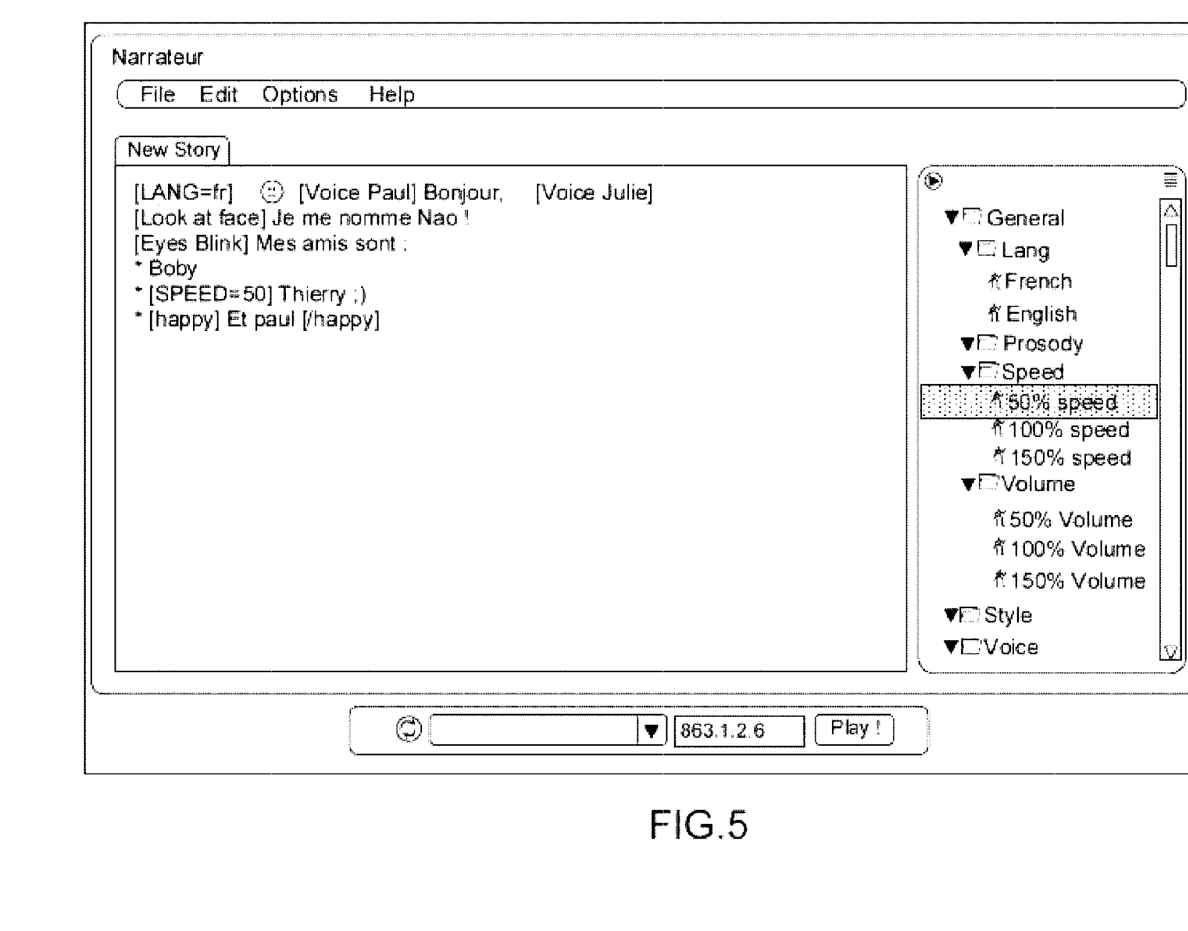
FIG. 5 is a second example of a scenario of use of the invention in one of its embodiments.

FIG. 5 is a second example of a scenario of use of the invention in one of its embodiments.

In this example, a graphic tag is inserted. This tag has the appearance of a "smiley" or emoticon, which is now a common language used in messaging systems and in Internet chats. This type of tag makes it difficult to make even more intuitive the use of the editing and control system of the invention.

Figure 6:
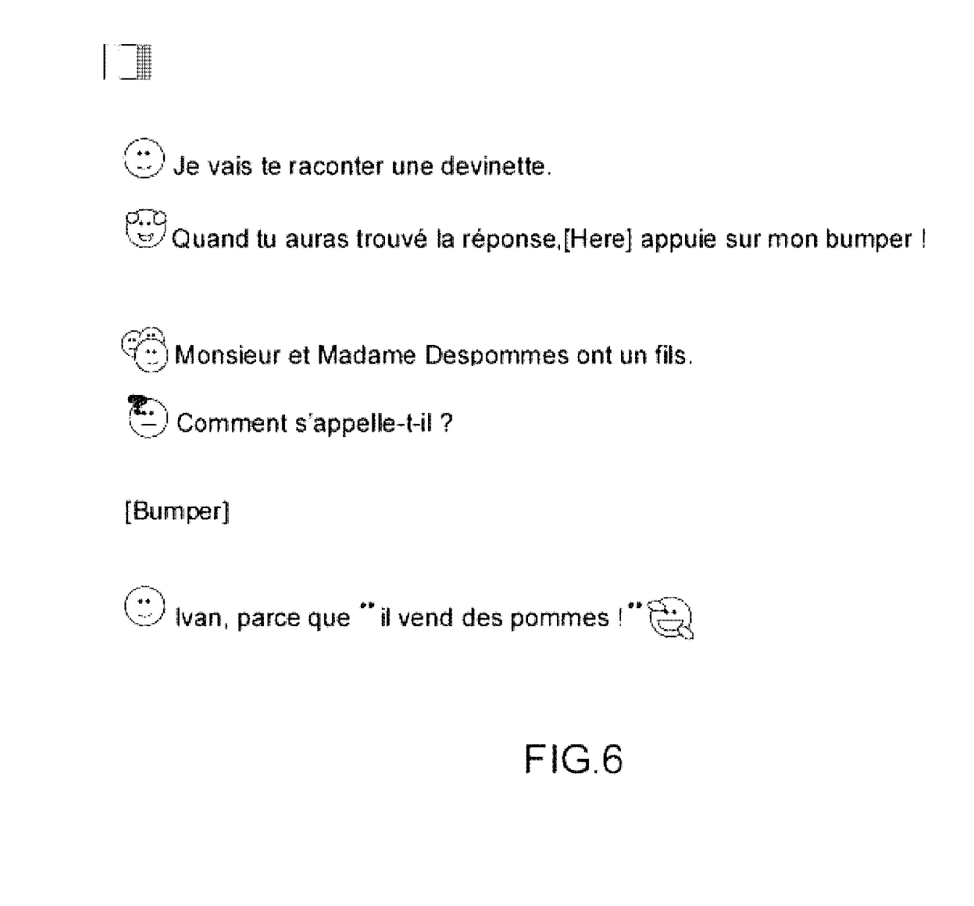
FIG. 6 is a third example of a scenario of use of the invention in one of its embodiments.
Figure 7:
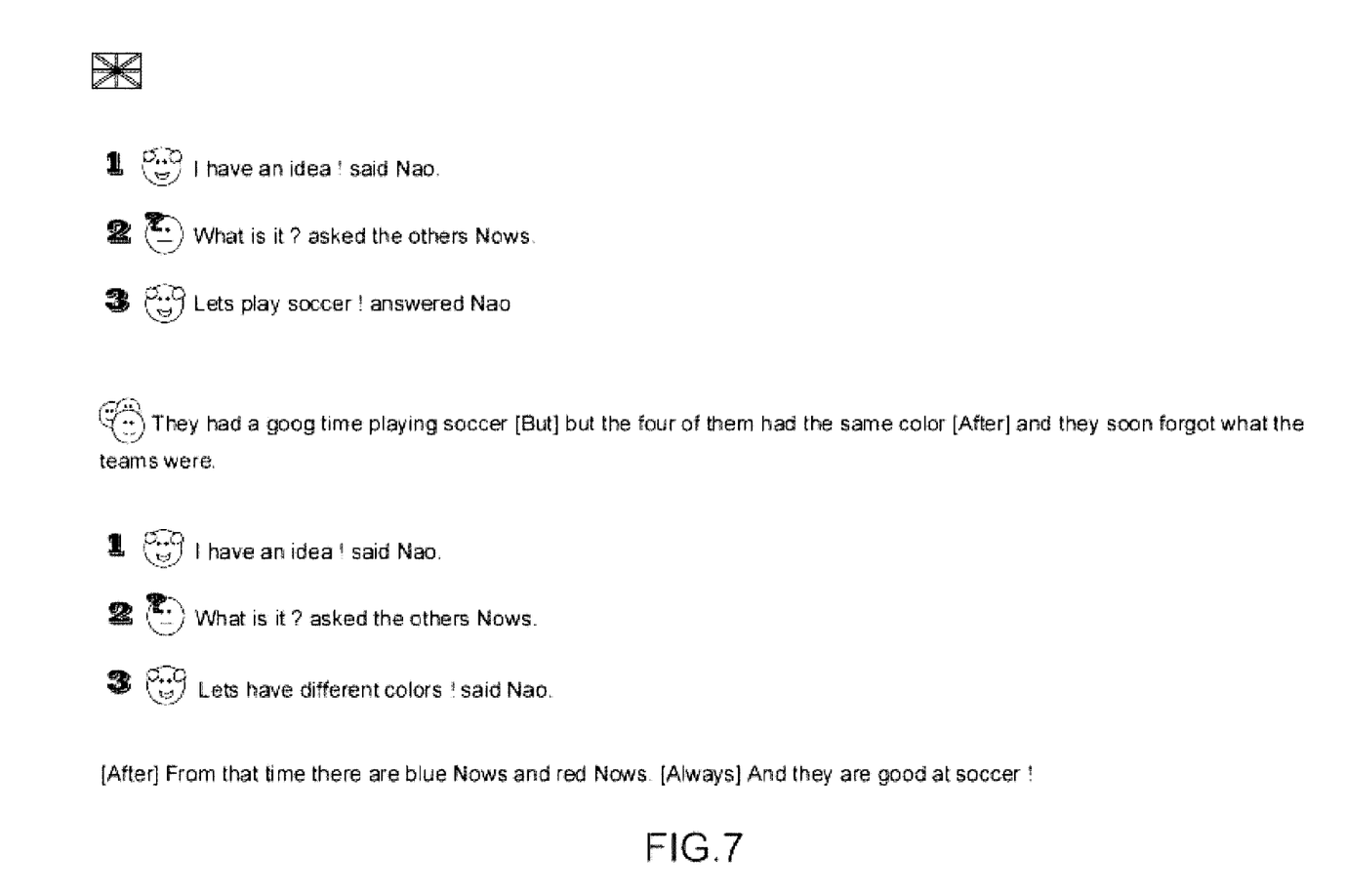
FIG. 7 is a fourth example of a scenario of use of the invention in one of its embodiments.

FIG. 6 is a third example of a scenario of use of the invention in one of its embodiments;

FIG. 7 is a fourth example of a scenario of use of the invention in one of its embodiments.

In FIG. 6, the various tags have meanings as follows:
French flag->to French language
smiley (or emoticon) with arm in the air->exclamation
smiley (or emoticon) with question mark->interrogative posture (looking up, hands on hips)
[Bumper] wait for a bumper (pushbutton on the foot) to be pressed to continue the story
quote marks->citation gesture
laughing smiley->joker tag The two figures clearly illustrate the possible combination of several types of tags within one and the same script. In particular, FIG. 7 combines graphic tags and textual tags.

The user also has the option to modify the name of the tags at will and thus replace them with a word of his or her choice. He or she can also decide to create a new behavior which will be associated with a word of his or her choice. For example, he or she may perfectly well decide that each time "hi" is written in the editing and control system of the invention, the robot accompanies this word with a motion of the hand, the behavior containing the motion of the hand will therefore be associated with the "hi" tag.

A tag can be programmed to correspond to several behaviors: thus, on each reading the behavior may change (it is either taken randomly, or sequentially, or may be dependent on the preceding and following words and tags, that is to say, contextualized).

The invention can be implemented on a market-standard computer which communicates with one or more robots via wired or wireless links. The commands are advantageously generated by the editing and control system disclosed by the French patent application No. 09/53434 already cited. The robot or robots are advantageously provided with a three-level control and command architecture as disclosed by the French patent application No. 08/01956000 also filed in the name of the applicant. They should be provided with software making it possible to interpret the commands sent by the command generator of the invention.

The examples described above are given to illustrate embodiments of the invention. They in no way limit the scope of the invention which is defined by the following claims.

The invention claimed is:

1. A system for editing and controlling physical behaviors of at least one robot by a user having access to a graphical interface, comprising:
   a computer configured to implement a module for editing any text to be spoken by the robot;
   a sound synthesis device comprising a sound synthesis module for synthesizing said text;
   a library of command tags stored on the computer for effectuating physical behaviors to be executed by the robot, said command tags being graphic symbols representative of said physical behaviors; and
   the computer configured to implement a module for inserting said tags into said text and a module for generating and controlling the physical behaviors of said robot,
   said system being configured to allow a selection of at least one of command tag in the library, said library being distinct from the text to be spoken, and to allow an insertion of said tag in a sequence of words of said text to launch an execution of a behavior defined by a graphic symbol and concomitant with saying said text to be spoken.

2. The system according to claim 1, wherein at least some of the command tags are inserted into the text between at least one opening separator and at least one closing separator, which respectively trigger a start of a series of the physical behaviors and an end of said series.

3. The system according to claim 1, the computer further comprising an environment monitoring module interfaced with sensors embedded in the robot for monitoring the environment of the robot, wherein said library of command tags comprises at least one tag for controlling the physical behavior of the robot dependent on an environment of the robot.

4. The system according to claim 1, wherein the library of command tags comprises at least one tag selected from a group of wait commands and commands in response to an expected external action.

5. The system according to claim 1, wherein the command tags are selected from a group comprising said graphic symbols, punctuation marks, and words.

6. The system according to claim 1, wherein at least some of the command tags are inserted into the text in the form of a list, each item in said list corresponding to a phrase member with which a group of physical behaviors is associated.

7. The system according to claim 1, wherein the physical behaviors to be executed by the robot are selected from the group comprising combinations of modulations of voices reading a text and gestures accompanying the text and signal emissions.

8. The system according to claim 7, wherein the modulations of the voices are selected from a group comprising combinations of different languages, voices, tones, speeds, and intonations.

9. The system according to claim 1, wherein the module for editing the text communicates with the module for controlling the physical behaviors of the robot by an electronic messaging module.

10. The system according to claim 1, wherein the system is configured to communicate with elements belonging to a controlled group comprising physical robots, virtual robots, and computers.

11. The system according to claim 10, wherein the physical and virtual robots belonging to the controlled group each execute a part of the text determined by at least one command tag characteristic of each of the elements of the controlled group.

12. The system according to claim 1, wherein the physical behavior controlled by a command tag changes according to a random change, a cyclic change, or a contextual change.

13. A method for editing and controlling physical behaviors of at least one robot by a user having access to a graphical interface, comprising:

editing at a computer, any text to be spoken by the robot;

synthesizing, at a sound synthesis device, sound corresponding to said text;

reading, at the computer, from a library of command tags of physical behaviors to be executed by the robot, said library of command tags being graphic symbols representative of said physical behaviors;

inserting, at the computer, said tags into said text; and controlling, via a control module of the computer, the physical behaviors of said robot, wherein:

at least one tag is selected in said library, said library being distinct from the text to be spoken, and inserted in a sequence of words of said text to launch the execution of a behavior defined by a graphical symbol, concomitant with saying said text to be spoken.

14. The method for editing and controlling behaviors according to claim 13, wherein the command tags are inserted into the text between at least one opening separator and at least one closure separator which respectively trigger a start of a series of the physical behaviors and an end of said series.

* * * * *